US009465583B2

(12) United States Patent
Osiecki et al.

(10) Patent No.: US 9,465,583 B2
(45) Date of Patent: Oct. 11, 2016

(54) RANDOM NUMBER GENERATION USING A NETWORK OF MOBILE DEVICES

(71) Applicant: International Business Machines Corporation, Armonk, NY (US)

(72) Inventors: Thomas Henry Osiecki, Austin, TX (US); Jan Simon Rellermeyer, Austin, TX (US); Mark William Stephenson, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 434 days.

(21) Appl. No.: 14/046,521

(22) Filed: Oct. 4, 2013

(65) Prior Publication Data
US 2015/0100613 A1    Apr. 9, 2015

(51) Int. Cl.
*G06F 7/58* (2006.01)

(52) U.S. Cl.
CPC .................................... *G06F 7/588* (2013.01)

(58) Field of Classification Search
CPC ....................................................... G06F 7/588
See application file for complete search history.

(56) References Cited

U.S. PATENT DOCUMENTS

| | | | |
|---|---|---|---|
| 6,073,016 A | 6/2000 | Hulthen et al. | |
| 6,094,572 A | 7/2000 | Fernandez et al. | |
| 8,321,672 B2 | 11/2012 | Asano | |
| 2006/0251249 A1* | 11/2006 | Orr | G06F 7/588 380/46 |
| 2008/0003991 A1* | 1/2008 | Sievers | G06F 8/65 455/418 |
| 2008/0270502 A1* | 10/2008 | Barak | G06F 7/588 708/253 |
| 2010/0036900 A1* | 2/2010 | Ross | G06F 7/58 708/254 |
| 2010/0195829 A1 | 8/2010 | Blom et al. | |
| 2010/0199339 A1 | 8/2010 | Kageyama et al. | |
| 2010/0274859 A1 | 10/2010 | Bucuk | |
| 2010/0318541 A1* | 12/2010 | Golwalkar | G06F 17/30389 707/759 |
| 2013/0013657 A1* | 1/2013 | Emelko et al. | G06F 7/588 708/251 |

OTHER PUBLICATIONS

Wikipedia, Server Farm, Aug. 29, 2012, pp. 1-5.*
random.org, What's this fuss about true randomness?, http://www.random.org.

* cited by examiner

*Primary Examiner* — Andrew Caldwell
*Assistant Examiner* — Calvin M Brien
(74) *Attorney, Agent, or Firm* — Garg Law Firm, PLLC.; Rakesh Garg; William Stock

(57) ABSTRACT

A method, system, and computer program product for random number generation using a network of mobile devices are provided in the illustrative embodiments. From a set of mobile devices, a corresponding set of data packets is received. A presence of raw sensor data is detected in a first data packet received from a first mobile device in the set of mobile devices. The raw sensor data comprises data corresponding to changing value of an output of a sensor in a set of sensors installed in the first mobile device. The raw sensor data is separated from the first data packet, resulting in an original data packet. A first random number is generated using the raw sensor data.

18 Claims, 7 Drawing Sheets

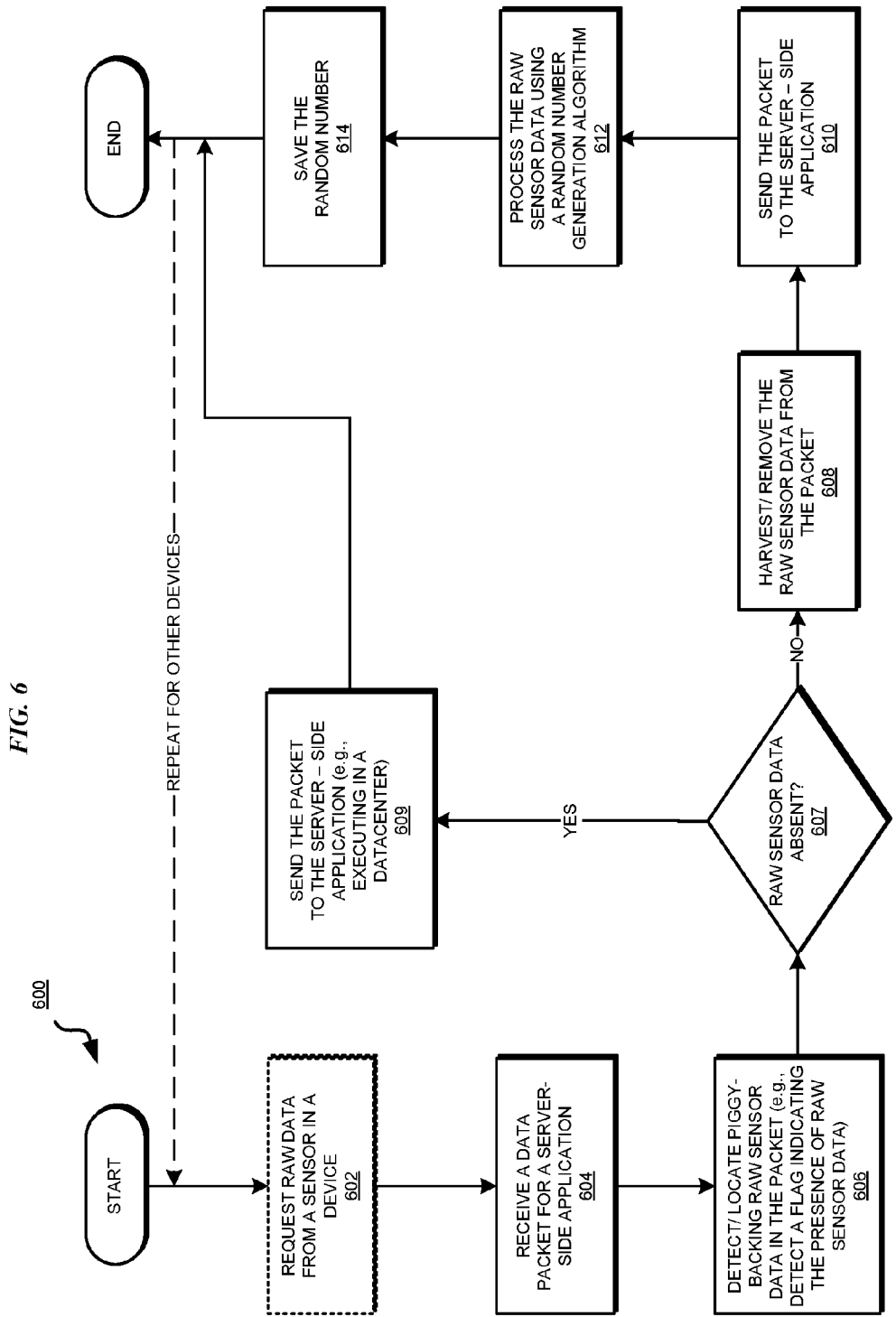

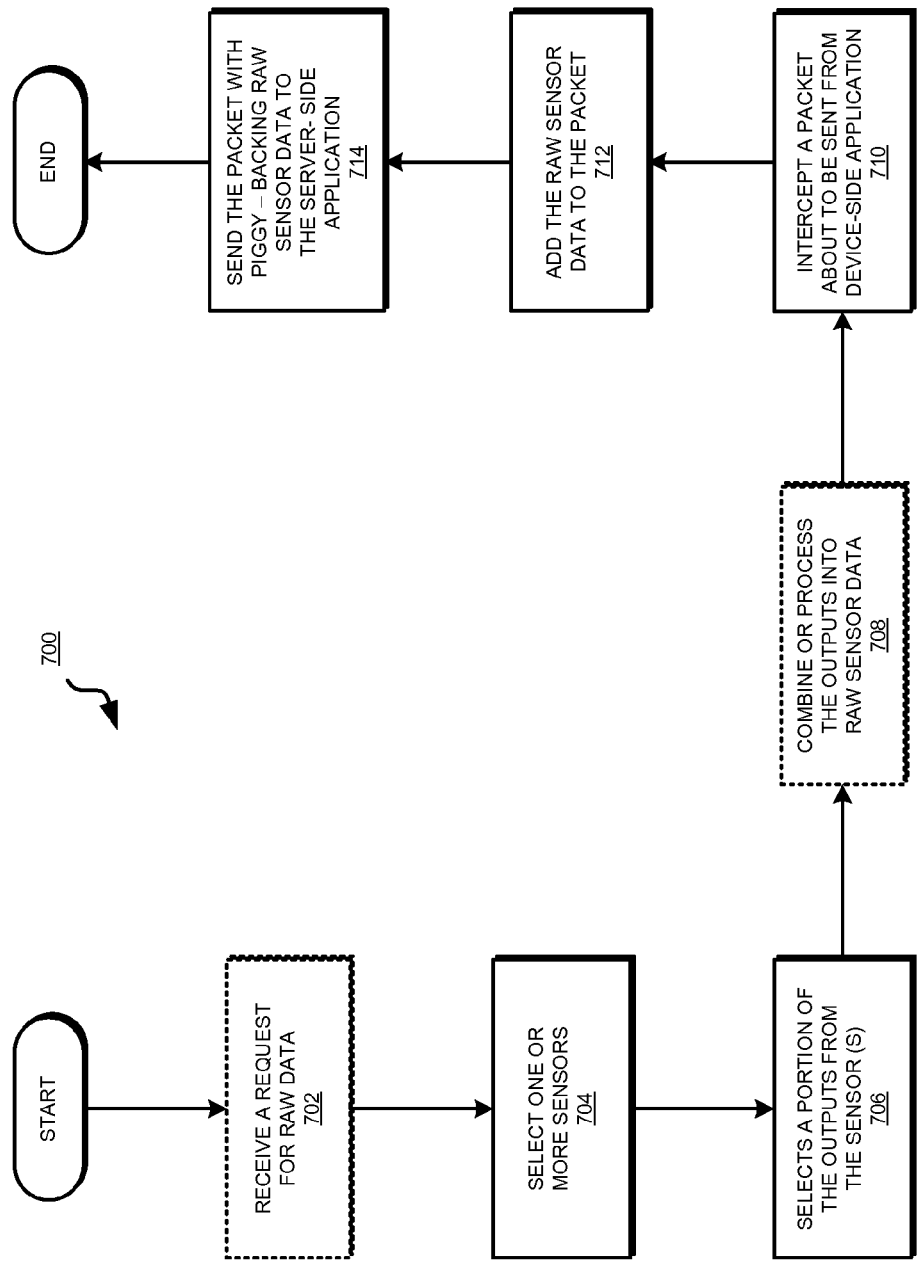

RANDOM NUMBER GENERATION USING A NETWORK OF MOBILE DEVICES

TECHNICAL FIELD

The present invention relates generally to a method, system, and computer program product for random number generation. More particularly, the present invention relates to a method, system, and computer program product for random number generation using a network of mobile devices.

BACKGROUND

A mobile device includes applications for performing various tasks. Often, a mobile application communicates with another application that executes on a server in a datacenter. A datacenter is a data processing environment where numerous data processing systems, such as server systems, are co-located and managed in a rack organization. A typical datacenter manages hundreds of racks.

A random number (RN) is a number in a set of numbers where the set exhibits statistical randomness by containing no recognizable pattern or regularities. Truly random numbers are difficult to generate. Most random numbers are pseudorandom, and are generated within a range of numbers using a random number generation algorithm. A quality of a random number represents how close to truly random the number is in a given set of random numbers. A high quality random number has at least a threshold degree of randomness, where the degree of randomness approaches true randomness.

Many applications in a typical datacenter need random numbers. For example, a server-side application uses random numbers to encrypt a session with a device-side application. Often dozens of real and virtual sessions are executing in a single rack at any given time in a typical datacenter, requiring a constant supply of high quality random numbers. A datacenter can thus have thousands of sessions needing thousands of high quality random numbers per second.

Practically all cryptographic techniques in use depend on random numbers. Therefore, a source of a significant volume of high quality random numbers is very attractive and essential for a datacenter.

SUMMARY

The illustrative embodiments provide a method, system, and computer program product for random number generation using a network of mobile devices. An embodiment detects, using a processor and a memory in a datacenter, a presence of raw sensor data in a first data packet received from a first mobile device in the set of mobile devices, wherein the raw sensor data comprises data corresponding to changing value of an output of a sensor in a set of sensors installed in the first mobile device. The embodiment separates the raw sensor data from the first data packet, resulting in an original data packet. The embodiment generates a first random number using the raw sensor data.

Another embodiment includes a computer usable program product comprising a computer usable storage device including computer usable code for random number generation. The embodiment further includes computer usable code for receiving, from a set of mobile devices, a corresponding set of data packets. The embodiment further includes computer usable code for detecting, using a processor and a memory in a datacenter, a presence of raw sensor data in a first data packet received from a first mobile device in the set of mobile devices, wherein the raw sensor data comprises data corresponding to changing value of an output of a sensor in a set of sensors installed in the first mobile device. The embodiment further includes computer usable code for separating the raw sensor data from the first data packet, resulting in an original data packet. The embodiment further includes computer usable code for generating a first random number using the raw sensor data.

Another embodiment includes a data processing system for random number generation. The embodiment further includes a storage device including a storage medium, wherein the storage device stores computer usable program code. The embodiment further includes a processor, wherein the processor executes the computer usable program code. The embodiment further includes computer usable code for receiving, from a set of mobile devices, a corresponding set of data packets. The embodiment further includes computer usable code for detecting, using a processor and a memory in a datacenter, a presence of raw sensor data in a first data packet received from a first mobile device in the set of mobile devices, wherein the raw sensor data comprises data corresponding to changing value of an output of a sensor in a set of sensors installed in the first mobile device. The embodiment further includes computer usable code for separating the raw sensor data from the first data packet, resulting in an original data packet. The embodiment further includes computer usable code for generating a first random number using the raw sensor data.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 6 depicts a flowchart of an example process for random number generation using a network of mobile devices in accordance with an illustrative embodiment; and FIG. 7 depicts a flowchart of another example process for random number generation using a network of mobile devices in accordance with an illustrative embodiment.

DETAILED DESCRIPTION

Figure 1:
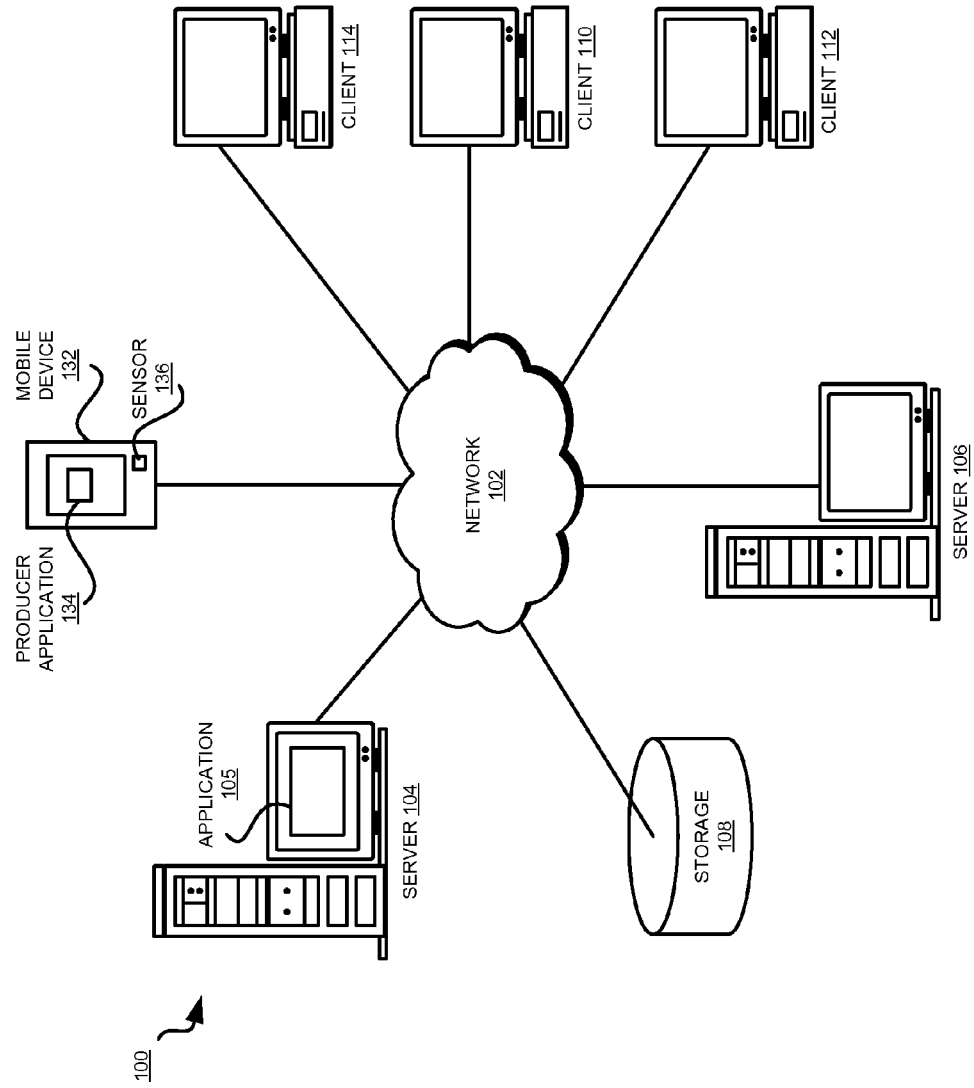
FIG. 1 depicts a block diagram of a network of data processing systems in which illustrative embodiments may be implemented.

A mobile device within the scope of the illustrative embodiments is a portable or mobile computing platform in any suitable shape or form. Some examples of a mobile device contemplated within the scope of the illustrative embodiments includes but is not limited to a tablet data processing system, a smartphone, and a handheld or mobile component of a stationary data processing system or device such as a controller of a gaming console.

High quality random numbers in high volume are difficult to generate while meeting a threshold degree of randomness over a long period of continuous operation. Given sufficient volume and period of generation of pseudorandom numbers, a motivated individual or an ingenious system can predict the upcoming random numbers and pose a security risk to data that uses the upcoming random numbers. Reuse of previously generated and used random numbers, just to keep up with the demand for random numbers also disrupts the randomness and poses security risks to data that reuses the random numbers.

The illustrative embodiments used to describe the invention generally address and solve the above-described problems and other problems related to generating high quality random numbers in large volumes. The illustrative embodiments provide a method, system, and computer program product for random number generation using a network of mobile devices.

The illustrative embodiments recognize that applications executing in a datacenter interact with a large number of mobile devices, perhaps hundreds or even thousands of mobile devices, at any given time. The illustrative embodiments further recognize that a mobile device often includes one or more sensors for sensing a variety of events in the environment of the mobile device.

For example, a modern smartphone typically includes one or more proximity sensors, light sensors, touch sensors, movement sensors, direction sensors, or a combination thereof. The illustrative embodiments recognize that naturally occurring phenomena are sufficiently random and can often be sensed in some manner using one or more sensors in a mobile device. Similarly, manmade events occurring during the normal handling of a mobile device by a user are also sufficiently random and can be sensed using a sensor in the mobile device in a similar manner.

A sensor produces some output in response to sensing an event. This disclosure refers to the output produced from the sensor as raw data or raw sensor data. The raw data can take the form of a bit-pattern, or a change or a series of changes in a signal value of a signal from the sensor.

An embodiment senses a natural or manmade event using a sensor in a mobile device. The embodiment packages the raw data from the sensor into a data packet already used in a communication between a device-side application executing on the mobile device and a server-side application executing in a datacenter. In other words, the raw sensor data is piggy-backed onto the data packet that was already going to be communicated to the server-side application. The embodiment senses the event and packages the raw data periodically, based on an event, or upon demand.

In one embodiment, a random number generation algorithm executing on the mobile device converts the raw data into a random number. The embodiment packages the random number instead of the raw data into the data packet.

An embodiment executing in a datacenter recognizes the presence of raw sensor data in a data packet arriving into the datacenter. The embodiment removes, or harvests, the raw sensor data from the data packet. The embodiment then sends the data packet, with the piggy-backed raw sensor data removed there from, to the server-side application. The embodiment uses the removed raw sensor data in a random number generation algorithm to generate a random number.

In one embodiment, when a random number is piggy-backed onto the data packet instead of the raw sensor data, the embodiment removes the random number from the data packet. The random number is then ready for use in the datacenter.

Because a communication is already occurring using the data packet between the device-side and the server-side applications, an embodiment adds negligible additional communications cost to communicate the raw sensor data or the device-side-generated random number to a datacenter. When an embodiment communicates raw sensor data in this manner to a datacenter, the embodiment adds only a negligible computational cost to the device. When an embodiment piggy-backs a random number to a datacenter, the embodiment adds only a slightly higher but still computational cost to the device, but the higher cost is still comparatively negligible in comparison to the computational cost of executing most device-side applications.

An embodiment in the datacenter receives raw sensor data, random numbers, or a combination thereof, from a network of mobile devices communicating with the datacenter at a given time. Thus, an embodiment allows the datacenter access to a significant volume of high quality random numbers, or raw data to generate those random numbers, for as long as the need for random number exists in the datacenter.

The illustrative embodiments are described with respect to certain events, sensors, devices, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
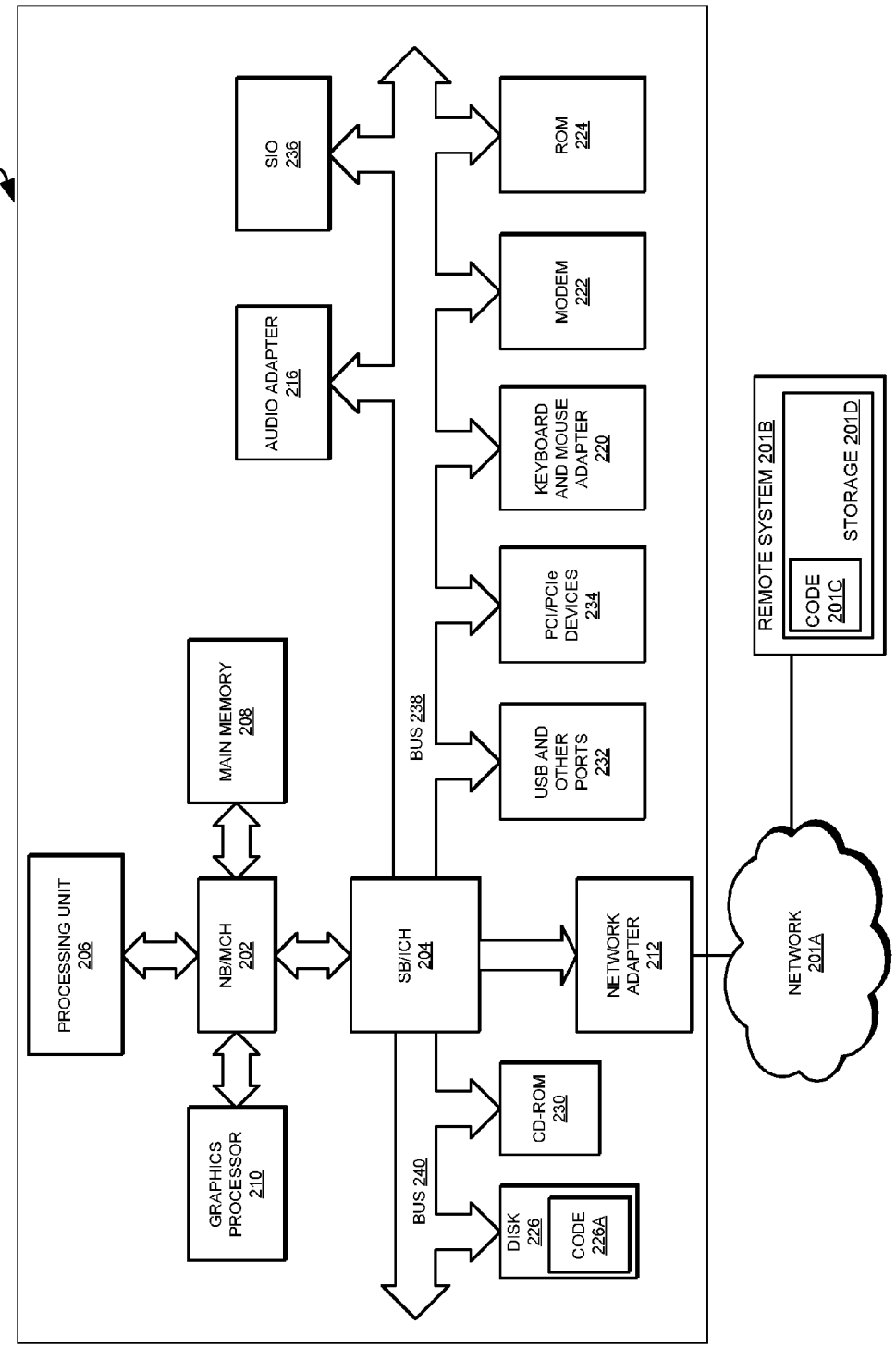
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. In one example configuration, mobile device 132 is any mobile device contemplated within this disclosure. Application 134 operates in mobile device 132 in conjunction with a device-side application executing on mobile device 132. Mobile device 132 includes any number of sensors in a manner similar to sensor 136. Application 134 implements an embodiment described herein on the device-side, such as to acquire raw sensor data from sensor 136 and modify a data packet to carry the raw sensor data or a random number computed there from to a datacenter. Application 105 operates in a datacenter in conjunction with a server-side application executing on a server in the datacenter. Application 105 implements another embodiment described herein. For example, application 105 executes in a datacenter to receive a data packet including piggy-backing raw sensor data or a random number, remove the raw sensor data or the random number from the data packet, and use the raw sensor data for random number generation.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments. Data processing system 200 is also representative of a device, such as device 132 in FIG. 1 in which computer usable program code or instructions implementing the processes of the illustrative embodiments may be located for the illustrative embodiments. Data processing system 200 is also representative of an embedded, removable, or mobile computing device, such as an example implementation of mobile device 132 in FIG. 1, in which computer usable program code or instructions implementing the processes of the illustrative embodiments may be located. Data processing system 200 is described as a computer only as an example, without being limited thereto. Implementations in the form of mobile device 132 in FIG. 1 may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 115 and browser 117 in FIG. 1, are located on storage devices, such as in the form of code 226A on hard disk drive 226, and may be loaded into at least one of one or more memories, such as main memory 208, for execution by processing unit 206. Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
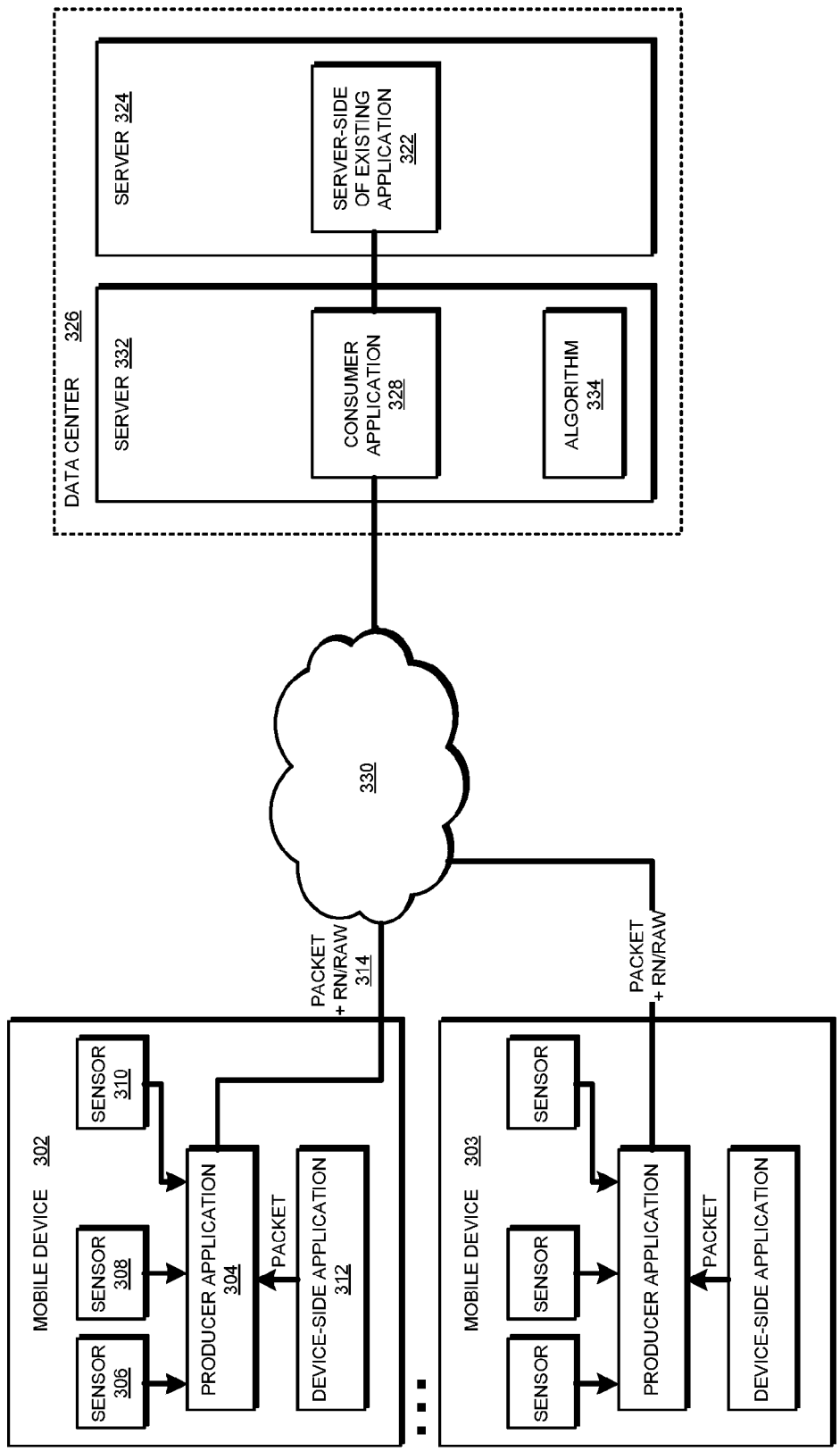
FIG. 3 depicts a block diagram of an example configuration for random number generation using a network of mobile devices in accordance with an illustrative embodiment.

With reference to FIG. 3, this figure depicts a block diagram of an example configuration for random number generation using a network of mobile devices in accordance with an illustrative embodiment. Mobile device 302 is an example of mobile device 132 in FIG. 1. Device 303 is another example of mobile device 132 and is configured and operates in the manner of device 302 as described herein. Producer application 304 in mobile device 302 is an example of application 134 in FIG. 1. Sensors 306, 308, and 310 are any number and type of sensors in mobile device 302. Each of sensors 306-310 is an example of sensor 136 in FIG. 1.

Producer application 304 receives raw data from one or more of sensors 306, 308, and 310. In the embodiment, producer application 304 combines the raw data from more than one sensors to produce the raw sensor data for piggy-backing onto a data packet. In another embodiment, producer application 304 selects the raw sensor data of one of sensors 306, 308, or 310 as the raw data to piggy back onto a data packet.

Device-side application 312 is an existing application executing on mobile device 302. Device-side application 312 creates a data packet for sending to server-side application 322 executing on server 324 in datacenter 326.

Producer application 304 receives or intercepts the data packet. Producer application 304 modifies the data packet to also contain the raw sensor data. For example, in one embodiment, producer application 304 adds the raw sensor data to a predetermined unused data field in the data packet. In another embodiment, producer application 304 modifies a data field in the data packet such that the data loaded in the data field by device-side application 312 is combined with the raw sensor data. The raw sensor data is combined with the already loaded data in such a manner that consumer application 328 can separate the raw sensor data from the data loaded by device-side application 312.

Producer application 304 sends the packet 314 over network 330 to datacenter 326. Packet 314 includes the data contained in the data packet originally produced by device-side application 312 and the raw sensor data that producer application 304 loads into the data packet.

Consumer application 328 in server 332 is an example of application 105 in server 104 in FIG. 1. When packet 314 arrives at datacenter 326, consumer application 328 receives or intercepts packet 314. Consumer application 328 removes, separates, or harvests the raw sensor data from packet 314. The removal or harvesting of the raw sensor data form packet 314 recreates the original data packet as was created from device-side application 312 in mobile device 302. Consumer application 328 sends the original data packet to server-side application 322, which was the original destination of the data packet.

Consumer application 328 saves the raw sensor data in a data storage, such as in a memory or data storage device (not shown) associated with server 332 or in another data storage device (not shown) in datacenter 326. Consumer application 328 or another application can use the saved raw sensor data for generating a random number using random number generation algorithm 334. Algorithm 334 is shown to execute in server 332 only as an examples, and can be executed in any data processing system in datacenter 326 without limitation.

Figure 4:
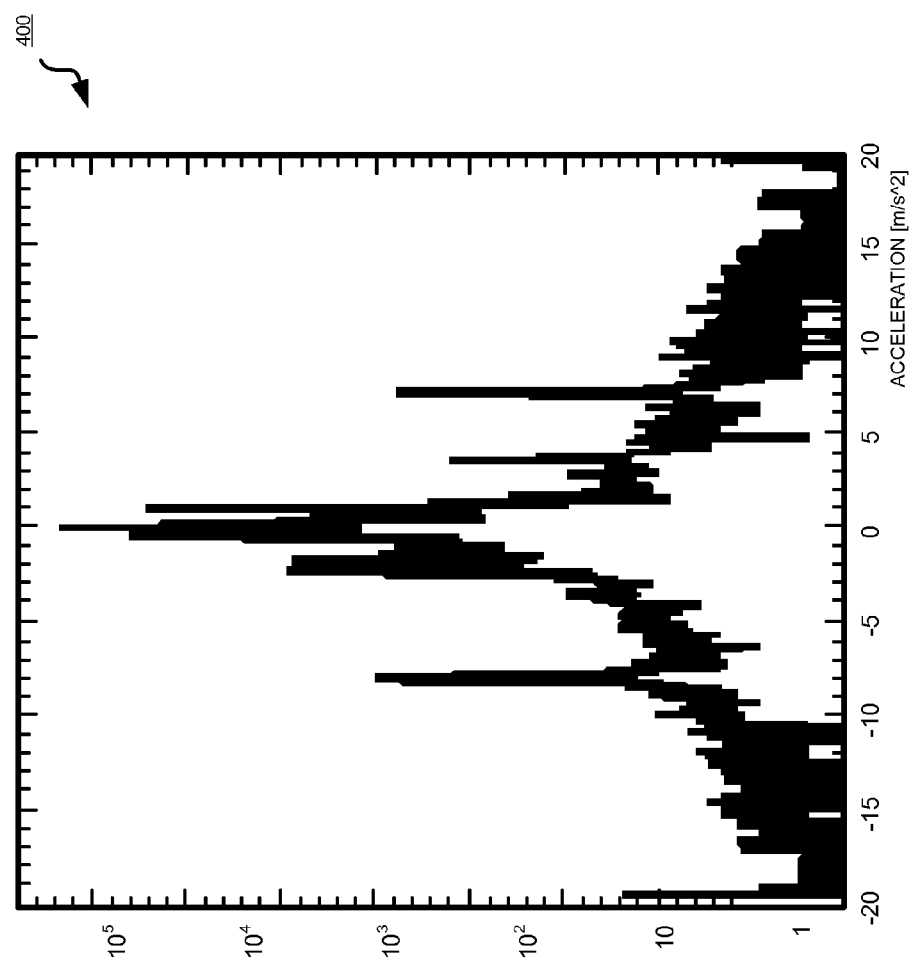
FIG. 4 depicts an example histogram of accumulated raw sensor data over some time usable in accordance with an illustrative embodiment.

With reference to FIG. 4, this figure depicts an example histogram of accumulated raw sensor data over some time usable in accordance with an illustrative embodiment. An accelerometer is a type of motion sensor configured to detect motion along one or more axes in a three dimensional space. An accelerometer is integrated into a mobile device, such as in the form of sensor 306 in device 302 in FIG. 3. The accelerometer detects a change in the weight experienced by a mass when the mass is moved in a certain direction. Graph 400 plots the X-axis sensor output of a commonly-used accelerometer in a presently available smartphone.

As is evident from histogram 400, the ridges in the plot of graph 400 are highly unlikely to be duplicated exactly in any two motions, such as in the motions from swaying, shaking, dropping, vibrating, or other movements of the associated mobile device. The ridges in the plot are output from an accelerometer in the form of a voltage that varies in proportionality to the heights of the ridges of the plot. An embodiment, such as an embodiment implemented in producer application 304 in FIG. 3, captures the varying voltage signal value in the form of raw sensor data.

The accelerometer and the X-axis acceleration change data of graph 400 is described only as an example of the raw sensor data and not as a limitation on the illustrative embodiments. Those of ordinary skill in the art will be able to conceive from this disclosure many other types of raw sensor data and sensors usable for a similar purpose and the same are contemplated within the scope of the illustrative embodiments.

Figure 5:
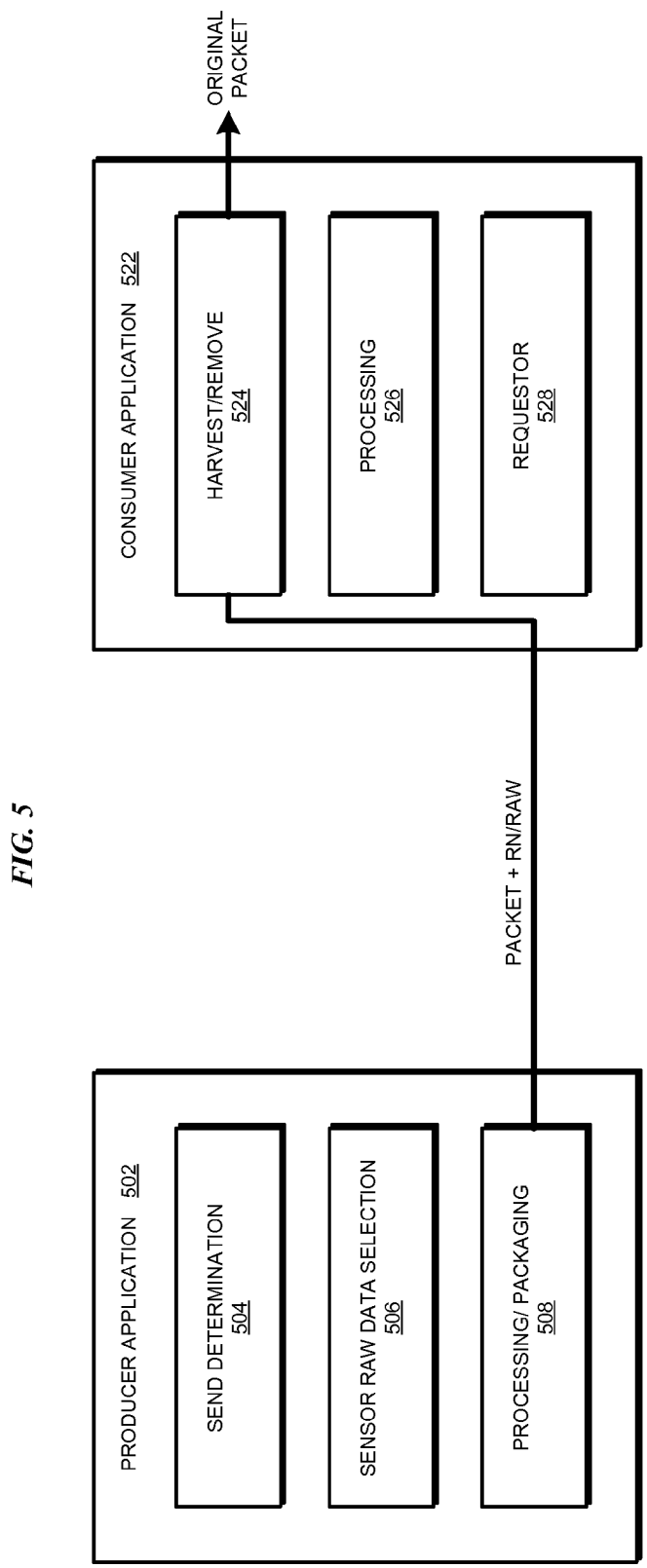
FIG. 5, this figure depicts a block diagram of an example configuration of producer and consumer applications for random number generation using a network of mobile devices in accordance with an illustrative embodiment.

With reference to FIG. 5, this figure depicts a block diagram of an example configuration of producer and consumer applications for random number generation using a network of mobile devices in accordance with an illustrative embodiment. Producer application 502 is an example of producer application 304 in FIG. 3 and implements an embodiment described herein. Consumer application 522 is an example of consumer application 328 in FIG. 3 and implements another embodiment described herein.

Component 504 in producer application 502 determines when to send the raw sensor data to consumer application 522. For example, in one embodiment, component 504 determines that the raw sensor data should be sent upon demand from consumer application 522. In another example embodiment, component 504 determines to send the raw sensor data without a request and at a time of component 504's choosing. In another example embodiment, component 504 sends the raw sensor data upon request from consumer application 522 as well as without a request.

Component 506 select one or more sensors whose raw sensor data should be sent to consumer application 522. In one embodiment, component 506 selects one sensor from a set of sensors installed in the mobile device where producer application 502 is executing. In another embodiment, component 506 selects a subset of sensors from the set of sensors.

In another embodiment, component 506 selects one sensor or more from the set of sensors depending on the conditions, motions, or events being experienced by the mobile device at the time of selecting the raw data feed from the sensors. For example, when a device is at rest during a video presentation, raw data feed of a motion sensor, such as an accelerometer, is not likely to have much variability, but a light sensor might be producing a raw data feed of greater than a threshold degree of variability in the ambient light due to the video presentation. Accordingly, an embodiment may select the raw data feed from the ambient light sensor over the raw data feed of the motion sensor.

Component 506 in an embodiment can similarly compare any number of raw data feeds from any number of sensors to determine which sensors and the corresponding raw data to select for sending as raw sensor data to consumer application 522. Furthermore, when more than one raw data feeds from more than one corresponding sensors are selected, component 506 can combine the several raw data feeds into a single raw sensor data sequence. Some example methods of combining several raw data feeds, without implying a limitation to such combining methods, are adding, subtracting, and averaging the values from different raw data feeds at a set of time instances over a period. Those of ordinary skill in the art will be able to conceive from this disclosure other methods of combining several raw data feeds into a single raw sensor data sequence, and the same are contemplated within the scope of the illustrative embodiments.

Processing and packaging component 508 receives the raw sensor data from component 506. In one embodiment, component 508 processes the raw sensor data by executing a random number generating algorithm on the mobile device and generating a random number. In another embodiment, component 508 processes the raw sensor data by adjusting a size, data-type, or both, of the raw sensor data so that the raw sensor data can be accommodated into a data field in a data packet.

Component 508 packages the raw sensor data—as received from component 506 or a modified form thereof—into a data packet. For example component 508 adds the raw sensor data into a data field of an original data packet created by device-side application 312 in FIG. 3. In one embodiment, component 508 packages into a data packet the random number generated from processing the raw sensor data.

Component 524 harvests or removes the raw sensor data or random number from a data packet. For example, in one example embodiment, component 524 receives the data packet including the raw sensor data or a random number generated there from producer application 502. Component 524 removes the raw sensor data or the random number, as the case may be, from the data packet, and sends the remaining original data packet to the intended recipient, such as server-side application 322 in FIG. 3.

If raw sensor data is removed from the data packet received from producer application 502, component 526 processes the raw sensor data by executing a random number generating algorithm on the data processing system in the datacenter where consumer application 522 is executing, and generating a random number. In another embodiment, even when a random number is removed from the data packet received from producer application 502, component 526 processes the random number by using the random number as a seed in executing a random number generating algorithm on the data processing system in the datacenter where consumer application 522 is executing, and generating another random number, such as a larger random number compared to the random number received from producer application 502.

Optional requestor component 528 can request a random number or raw sensor data from producer application 502. For example, when used, component 528 sends a request (not shown) to producer application 502. Component 504 sends the raw sensor data or random number in response to the request from component 528 in consumer application 522.

With reference to FIG. 6, this figure depicts a flowchart of an example process for random number generation using a network of mobile devices in accordance with an illustrative embodiment. Process 600 can be implemented in consumer application 522 in FIG. 5.

The application begins process 600 by, optionally, requesting raw sensor data (block 602). The application can also begin process 600 by receiving or intercepting a data packet for a server-side application, such as application 322 in FIG. 3 (block 604).

The application detects the presence of raw sensor data that is piggy-backing on the data packet and locates a location thereof in the data packet (block 606). For example, not all data packets coming from producer application 502 in FIG. 5 may include raw sensor data. Furthermore, when the raw sensor data is present in data packets, the data packets containing the raw sensor data may be of different types at different times. The application determines whether raw sensor data is absent in the data packet (block 607). If the raw sensor data is absent ("Yes" path of block 607), the application sends the packet to the server-side application, e.g., an application executing in a server in a datacenter (block 609), and ends process 600 thereafter. If the raw sensor data is present in the data packet ("No" path of block 607), the application proceeds to block 608.

An embodiment may introduce the raw sensor data in some original data packets and may not introduce the raw sensor data in some original data packets created by a device-side application. Another embodiment may introduce the raw sensor data in some original data packet types and may not introduce the raw sensor data in some original data packet types created by a device-side application.

Block 606 of process 600 detects whether a given data packet includes raw sensor data, and if so, a location where the raw sensor data is present. Any suitable method can be used for identifying the raw sensor data in a data packet. For example, in one embodiment, block 606 can be implemented to find non-null values in a particular data field. In another embodiment, block 606 can be implemented to find a flag set in the data packet to indicate the presence of raw sensor data in a particular data field. Many other ways of indicating the presence or absence of raw sensor data in the data packet will be apparent from this disclosure to those of ordinary skill in the art and the same are contemplated within the scope of the illustrative embodiments.

While process 600 is described with respect to raw sensor data in the data packets, process 600 can be configured for using device-side-generated random numbers in a similar manner, and such configuration is contemplated within the scope of the illustrative embodiments. When a data packet includes neither raw sensor data nor a device-side-generated random number, process 600 allows (not shown) the data packet to proceed to a server-side application without further processing.

The application harvests or otherwise removes the raw sensor data from the data packet (block 608). The application sends the restored original data packet, sans the raw sensor data, to the server-side application (block 610).

In one embodiment, the application processes the raw sensor data using a random number generation algorithm, such as algorithm 334 in FIG. 3 (block 612). The application saves the resulting random number, such as for use by another process in the datacenter (block 614). The application ends process 600 thereafter. In another embodiment (not shown), the application omits processing the raw sensor data, and saves the raw sensor data for future random number generation.

With reference to FIG. 7, this figure depicts a flowchart of another example process for random number generation using a network of mobile devices in accordance with an illustrative embodiment. Process 700 can be implemented in consumer application 502 in FIG. 5.

The application begins process 700 by, optionally, receiving a request for raw sensor data, such as when block 602 in process 600 in FIG. 6 is used (block 702). The application can also begin process 700 by selecting one or more sensors from a set of sensors installed in a mobile device where the application is executing (block 704).

The application selects a portion of the outputs from the selected one or more sensors (block 706). The application may use the output of the one or more sensors as the raw sensor data. Optionally, the application may combine or otherwise process the one or more outputs to create the raw sensor data (block 708).

The application intercepts a packet being sent from a device-side application executing in the mobile device where the application is executing (block 710). The application adds or introduces the raw sensor data into the packet (block 712).

The application sends the packet with the piggy-backing raw sensor data to the server-side application, such as to application 322 in FIG. 3 (block 714). The application ends process 700 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for random number generation using a network of mobile devices. An embodiment allows a network of numerous accessible mobile devices to provide raw sensor data to a datacenter. Using an embodiment, the datacenter can use the supplied raw sensor data for random number generation. Random number generation in this manner ensures a continuous supply and sufficient volume of high quality random numbers to the processes executing within the datacenter.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable storage medium. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can store a program for use by or in connection with an instruction execution system, apparatus, or device. The term "computer readable storage device," or variations thereof, does not encompass a signal propagation media such as a copper cable, optical fiber or wireless transmission media.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for random number generation, the method comprising:

receiving, from a set of mobile devices, a corresponding set of data packets;

detecting, at a consumer application, using a processor and a memory in a datacenter, a presence of raw sensor data in a first data packet received from a first mobile device in the set of mobile devices, wherein the raw sensor data comprises data corresponding to a value of an output of a sensor in a set of sensors installed in the first mobile device, wherein the value of the output of the sensor changes over a period in response to the sensor sensing different events that occur during the period, wherein the first data packet is formed by modifying a data field in an original packet, the original packet being used in an already occurring communication between a device-side application executing on the first mobile device and a server-side application executing in the datacenter, wherein the data field in the original packet includes data loaded by the device-side application, and wherein the data field is modified without the participation of the device-side application by combining the raw sensor data with the data loaded in the data field;

separating, at the consumer application, the raw sensor data from the first data packet, the separating recreating the original data packet, wherein the consumer application is distinct from the server-side application, and wherein the server-side application is an original destination of the original packet; and generating a first random number using the raw sensor data.

2. The method of claim 1, further comprising:

detecting a presence of a second raw sensor data in a second data packet received from a second mobile device in the set of mobile devices, wherein the first data packet is of a first type different from a second type of the second data packet; and generating a second random number using the second raw sensor data.

3. The method of claim 1, further comprising:

detecting an absence of a second raw sensor data in a second data packet received from a second mobile device in the set of mobile devices, wherein a subset of the set of data packets includes raw sensor data; and sending the second data packet unaltered to the server-side application executing in the datacenter.

4. The method of claim 1, further comprising:

sending the original data packet to the server-side application executing in the datacenter.

5. The method of claim 1, wherein the raw sensor data comprises data obtained by combining values of outputs of a subset of sensors in the set of sensors installed in the first mobile device.

6. The method of claim 1, wherein the detecting comprises:

detecting that a flag in the first data packet indicates a presence of the raw sensor data in the data field in the first data packet.

7. The method of claim 1, wherein the raw sensor data is combined with a second data in the data field of the first data packet, such that the raw sensor data is separable from the second data upon reading the data field.

8. A computer usable program product comprising a computer usable storage device including computer usable code for random number generation, the computer usable code comprising:

computer usable code for receiving, from a set of mobile devices, a corresponding set of data packets;

computer usable code for detecting, at a consumer application, using a processor and a memory in a datacenter, a presence of raw sensor data in a first data packet received from a first mobile device in the set of mobile devices, wherein the raw sensor data comprises data corresponding to a value of an output of a sensor in a set of sensors installed in the first mobile device, wherein the value of the output of the sensor changes over a period in response to the sensor sensing different events that occur during the period, wherein the first data packet is formed by modifying a data field in an original packet, the original packet being used in an already occurring communication between a device-side application executing on the first mobile device and a server-side application executing in the datacenter, wherein the data field in the original packet includes data loaded by the device-side application, and wherein the data field is modified without the participation of the device-side application by combining the raw sensor data with the data loaded in the data field;

computer usable code for separating, at the consumer application, the raw sensor data from the first data packet, the separating recreating the original data packet, wherein the consumer application is distinct from the server-side application, and wherein the server-side application is an original destination of the original packet; and computer usable code for generating a first random number using the raw sensor data.

9. The computer usable program product of claim 8, further comprising:

computer usable code for detecting a presence of a second raw sensor data in a second data packet received from a second mobile device in the set of mobile devices, wherein the first data packet is of a first type different from a second type of the second data packet; and computer usable code for generating a second random number using the second raw sensor data.

10. The computer usable program product of claim 8, further comprising:

computer usable code for detecting an absence of a second raw sensor data in a second data packet received from a second mobile device in the set of mobile devices, wherein a subset of the set of data packets includes raw sensor data; and computer usable code for sending the second data packet unaltered to the server-side application executing in the datacenter.

11. The computer usable program product of claim 8, further comprising:

computer usable code for sending the original data packet to the server-side application executing in the datacenter.

12. The computer usable program product of claim 8, wherein the raw sensor data comprises data obtained by combining values of outputs of a subset of sensors in the set of sensors installed in the first mobile device.

13. The computer usable program product of claim 8, wherein the computer usable code for detecting comprises:

computer usable code for detecting that a flag in the first data packet indicates a presence of the raw sensor data in the data field in the first data packet.

14. The computer usable program product of claim 8, wherein the raw sensor data is combined with a second data in the data field of the first data packet, such that the raw sensor data is separable from the second data upon reading the data field.

15. The computer usable program product of claim 8, wherein the computer usable code is stored in a computer readable storage medium in a data processing system, and wherein the computer usable code is transferred over a network from a remote data processing system.

16. The computer usable program product of claim 8, wherein the computer usable code is stored in a computer readable storage medium in a server data processing system, and wherein the computer usable code is downloaded over a network to a remote data processing system for use in a computer readable storage medium associated with the remote data processing system.

17. A data processing system for random number generation, the data processing system comprising:
- a storage device including a storage medium, wherein the storage device stores computer usable program code; and
- a processor, wherein the processor executes the computer usable program code, and wherein the computer usable program code comprises:
- computer usable code for receiving, from a set of mobile devices, a corresponding set of data packets;
- computer usable code for detecting, at a consumer application, using the processor and a memory in a datacenter, a presence of raw sensor data in a first data packet received from a first mobile device in the set of mobile devices, wherein the raw sensor data comprises data corresponding to a value of an output of a sensor in a set of sensors installed in the first mobile device, wherein the value of the output of the sensor changes over a period in response to the sensor sensing different events that occur during the period,
- wherein the first data packet is formed by modifying a data field in an original packet, the original packet being used in an already occurring communication between a device-side application executing on the first mobile device and a server-side application executing in the datacenter, wherein the data field in the original packet includes data loaded by the device-side application, and wherein the data field is modified without the participation of the device-side application by combining the raw sensor data with the data loaded in the data field;
- computer usable code for separating, at the consumer application, the raw sensor data from the first data packet, the separating recreating the original data packet, wherein the consumer application is distinct from the server-side application, and wherein the server-side application is an original destination of the original packet; and
- computer usable code for generating a first random number using the raw sensor data.

18. The data processing system of claim 17, further comprising:
- computer usable code for detecting a presence of a second raw sensor data in a second data packet received from a second mobile device in the set of mobile devices, wherein the first data packet is of a first type different from a second type of the second data packet; and
- computer usable code for generating a second random number using the second raw sensor data.

* * * * *